US011908649B2

(12) United States Patent
Muniyappan et al.

(10) Patent No.: US 11,908,649 B2
(45) Date of Patent: Feb. 20, 2024

(54) ACTUATOR WITH THOMSON COILS

(71) Applicant: EATON INTELLIGENT POWER LIMITED, Dublin (IE)

(72) Inventors: Jayaraman Muniyappan, Pernambut (IN); Andrew L. Gottschalk, Monaca, PA (US); Robert Michael Slepian, Murrysville, PA (US)

(73) Assignee: EATON INTELLIGENT POWER LIMITED, Dublin (IE)

( * ) Notice: Subject to any disclaimer, the term of this patent is extended or adjusted under 35 U.S.C. 154(b) by 161 days.

(21) Appl. No.: 17/507,380

(22) Filed: Oct. 21, 2021

(65) Prior Publication Data

US 2023/0128354 A1 Apr. 27, 2023

(51) Int. Cl.

*H01H 50/02* (2006.01)
*H01H 50/44* (2006.01)
*H01H 50/64* (2006.01)

(52) U.S. Cl.

CPC ............ *H01H 50/44* (2013.01); *H01H 50/02* (2013.01); *H01H 50/64* (2013.01)

(58) Field of Classification Search

CPC ........ H01H 50/44; H01H 50/02; H01H 50/64; H01H 9/542; H01H 33/285; H01H 33/666; H01H 3/222; H01F 7/14
USPC ........................................................ 335/185
See application file for complete search history.

(56) References Cited

U.S. PATENT DOCUMENTS 2,159,088 A * 5/1939 Jeffrey ...................... E21B 3/02 200/465
3,091,958 A * 6/1963 Robins ................ G01M 3/3272 73/40
5,953,959 A * 9/1999 Organek ................... F16H 3/12 74/339
6,250,445 B1 * 6/2001 Davis ...................... F16D 27/08 192/222
8,791,779 B2 * 7/2014 Jonsson ............... H01H 50/323 335/121
10,825,625 B1 * 11/2020 Marshall ............ H01H 33/6662
11,183,348 B1 * 11/2021 Leccia ................... H01H 33/38
11,227,729 B1 * 1/2022 Rakus ...................... F16F 9/535
2002/0044036 A1 * 4/2002 Akita ................... H01H 33/285 335/256

(Continued)

FOREIGN PATENT DOCUMENTS

EP 1180776 A1 2/2002
WO 2013/007437 A1 1/2013

OTHER PUBLICATIONS

European Patent Office, "International Search Report and Written Opinion", for corresponding International PCT Patent Application No. PCT/EP2022/025480, dated Mar. 2, 2023, 14 pp.

*Primary Examiner* — Shawki S Ismail
*Assistant Examiner* — Lisa N Homza
(74) *Attorney, Agent, or Firm* — Eckert Seamans Cherin & Mellott, LLC

(57) ABSTRACT

An actuator, which is a part of a combination that includes a pair of circuit interrupters, advantageously employs a plurality of Thomson coils that are electrically connected in parallel and that interact with a corresponding set of Thomson plates of a rotatable armature in order to perform useful work in a rapid fashion. In one embodiment, the useful work is to commutate current from one circuit interrupter to the other.

20 Claims, 6 Drawing Sheets

(56) References Cited

U.S. PATENT DOCUMENTS

| | | | | |
|---|---|---|---|---|
| 2003/0056741 | A1 * | 3/2003 | Youqing | F01L 9/20 123/90.11 |
| 2011/0209676 | A1 * | 9/2011 | Malott, Jr. | F01P 5/04 123/41.11 |
| 2013/0027158 | A1 | 1/2013 | Bach et al. | |
| 2017/0343058 | A1 * | 11/2017 | Lee | F16D 41/082 |
| 2020/0066468 | A1 * | 2/2020 | Wang | H01F 7/123 |
| 2020/0194206 | A1 * | 6/2020 | Wang | H01H 9/0066 |
| 2020/0402752 | A1 * | 12/2020 | Leccia | H01H 33/6662 |
| 2020/0411261 | A1 * | 12/2020 | Zhou | H01H 33/59 |
| 2020/0411262 | A1 * | 12/2020 | Zhou | H01H 50/443 |
| 2021/0018049 | A1 * | 1/2021 | Balsdon | B60K 25/00 |
| 2022/0139654 | A1 * | 5/2022 | Holp | H01H 33/666 335/203 |
| 2022/0344115 | A1 * | 10/2022 | Das | H01H 1/66 |
| 2023/0024766 | A1 * | 1/2023 | Gottschalk | H01H 1/5833 |
| 2023/0128354 | A1 * | 4/2023 | Muniyappan | H01F 7/14 335/185 |

* cited by examiner

ACTUATOR WITH THOMSON COILS

BACKGROUND

Field

The disclosed concept relates generally to an actuator that employs a plurality of Thomson coils and, more particularly, to an ultrafast system that employees a plurality of axisymmetric Thomson coils to rotate an armature.

Related Art

A major goal of a power distribution company is to have a continuous supply of power to the end customer, be it residential loads or industrial. A circuit breaker that is used in a starting point of a distribution system is a low voltage vacuum interrupter.

A primary purpose of a circuit breaker is to protect downstream devices from a surge of current arising from a fault. This is accomplished by interrupting a fault current as quickly as possible in order to reduce the energy provided to the downstream devices. A vacuum bottle of a vacuum interrupter may have to undergo maintenance or replacement depending on how many faults it has seen. During this period maintenance or replacement, there will be a shutdown of power which is not desirable for the utility as it will have certain amount of monetary impact. Hence the fault current has to be commutated to a system which can sustain high fault current and interrupts quickly.

Power electronic breakers, such as solid-state circuit breakers, are particularly good at fast interruptions with low amounts of energy being let through. Unfortunately, these power electronic devices have high operational resistances that cause high power losses when they carry the breaker's load current. These high losses make them unsuitable for many applications.

One potential solution is to develop a hybrid breaker having both a vacuum interrupter and a power electronic interrupter in the form of a solid-state interrupter, where the solid-state interrupter only carries current during a fault. The vacuum interrupter is a more conventional path that carries the current during ordinary operation. The faster the fault current can be commutated from the conventional path to the power electronic path, the sooner the power electronics can interrupt the fault current, and the lower the amount of energy that is let through. Fast commutation is achieved by rapid opening of a mechanical switch.

A challenge in a hybrid circuit breaker is to provide a fast mechanism to open the VI contacts, so that the current can commutate to the semiconductor branch within a small span of time, before it crosses the maximum current handling capability of the semiconductor switches.

In a conventional Thomson coil actuator, a Thomson plate will be connected to a moving component and a Thomson coil will be situated adjacent the Thomson plate. The nature of force is a sudden impulse in this actuator. The total moving mass has a big impact on the travel that can be achieved by this type of actuator. As the mass of the Thomson plate increases, a higher amount of energy from the capacitor bank that excites the Thomson coil is required. With increased mass of the Thomsen plate, opening velocity can reduced, and the time required for moving the Thomsen plate between positions is increased. There is thus room for improvements in switching apparatuses.

SUMMARY

These needs and others are met by a number of embodiments of the invention, which are directed to an improved actuator and combination. As employed herein, the expression "a number of" shall refer broadly to any non-zero quantity, including a quantity of one.

As one aspect of the disclosed and claimed concept, an improved actuator can be generally stated as including a support, an armature that is rotatable with respect to the support about an axis of rotation, a plurality of Thomson coils that are each spaced from the axis of rotation, the armature can be generally stated as including a hub and a plurality of Thomson plates, the plurality of Thomson plates each being electrically conductive and extending from the hub, each Thomson plate of the plurality of Thomson plates being situated adjacent a corresponding Thomson coil of the plurality of Thomson coils when the plurality of Thomson coils are in a non-energized state, and the armature further can be generally stated as including an output shaft connected with the hub and being structured to rotate a rotational distance responsive to the Thomson coils being energized.

Another aspect of the disclosed and claimed concept includes an improved combination the general nature which can be stated as including a first circuit interrupter, a second circuit interrupter, and an actuator that is structured to switch a current path that includes a protected portion of a circuit between the first interrupter and the second interrupter, the actuator can be generally stated as including a support, an armature that is rotatable with respect to the support about an axis of rotation, a plurality of Thomson coils that are each spaced from the axis of rotation, the armature can be generally stated as including a hub and a plurality of Thomson plates, the plurality of Thomson plates each being electrically conductive and extending from the hub, each Thomson plate of the plurality of Thomson plates being situated adjacent a corresponding Thomson coil of the plurality of Thomson coils when the plurality of Thomson coils are in a non-energized state, and the armature further can be generally stated as including an output shaft connected with the hub and being structured to rotate a rotational distance responsive to the Thomson coils being energized.

BRIEF DESCRIPTION OF THE DRAWINGS

A full understanding of the disclosed concept can be gained from the following Description when read in conjunction with the accompanying drawings in which.

Similar numerals refer to similar parts throughout the Specification.

DESCRIPTION

Figure 1:
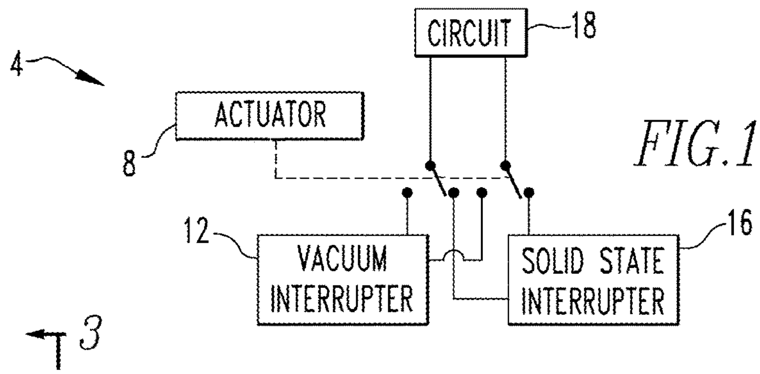
FIG. 1 is a schematic view of an improved combination in accordance with the disclosed and claimed concept.

An improved actuator 4 in accordance with the disclosed and claimed concept is depicted in a schematic fashion in FIG. 1 as being a part of an improved combination 8 that is likewise in accordance with the disclosed and claimed concept. The combination 8 further includes a first circuit interrupter 12 that is in the exemplary form of a vacuum interrupter and a second circuit interrupter 16 that is in the exemplary form of a solid-state circuit interrupter. The combination 8 is connected with a protected portion of a circuit 18, and the actuator 4 is advantageously operable to rapidly commutate the current in the circuit 18 between the first circuit interrupter 12 and the second circuit interrupter 16 in, for example, a fault condition or other appropriate condition.

Figure 2:
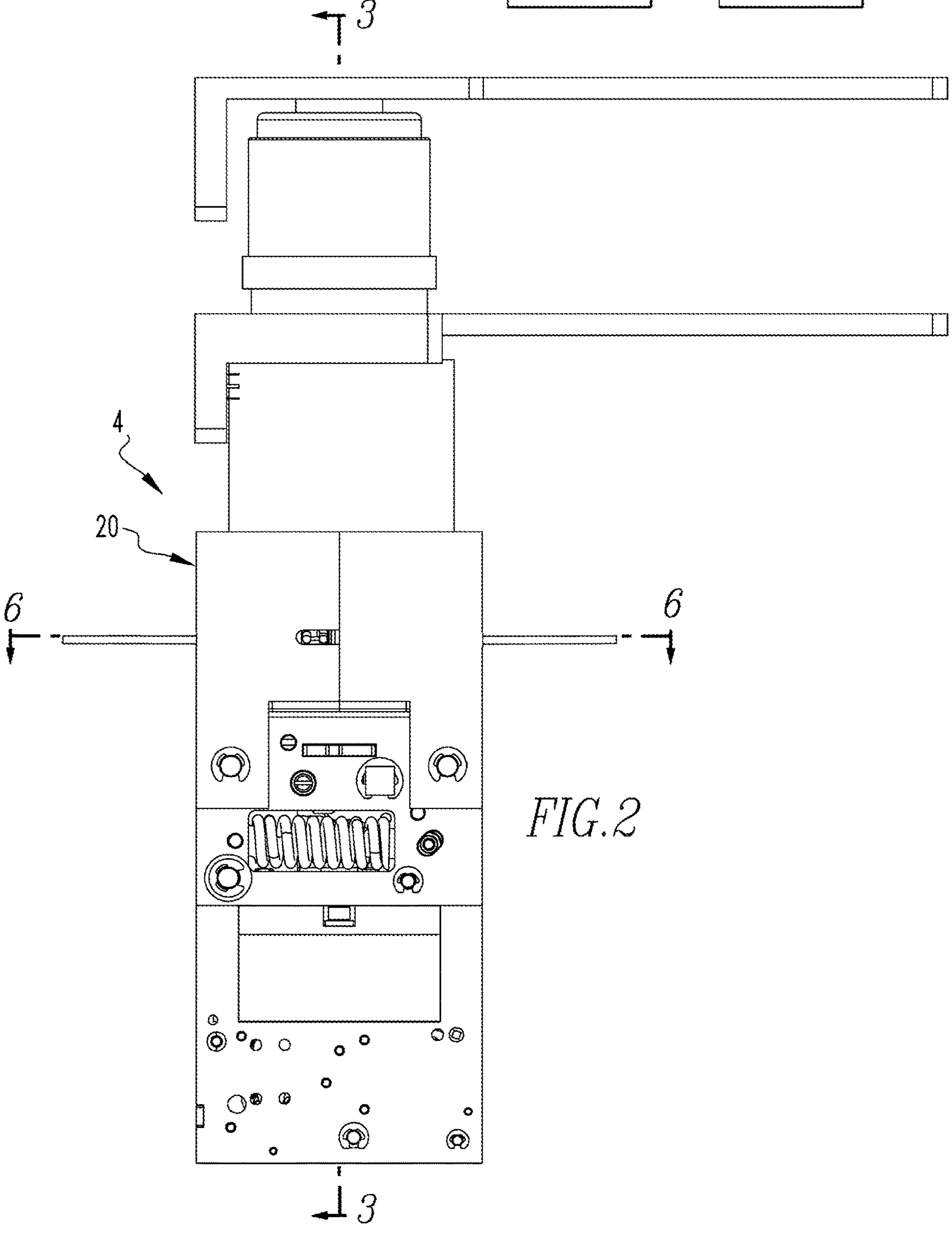
FIG. 2 is view of an improved actuator of the combination of FIG. 1 that is likewise in accordance with the disclosed and claimed concept.
Figure 3:
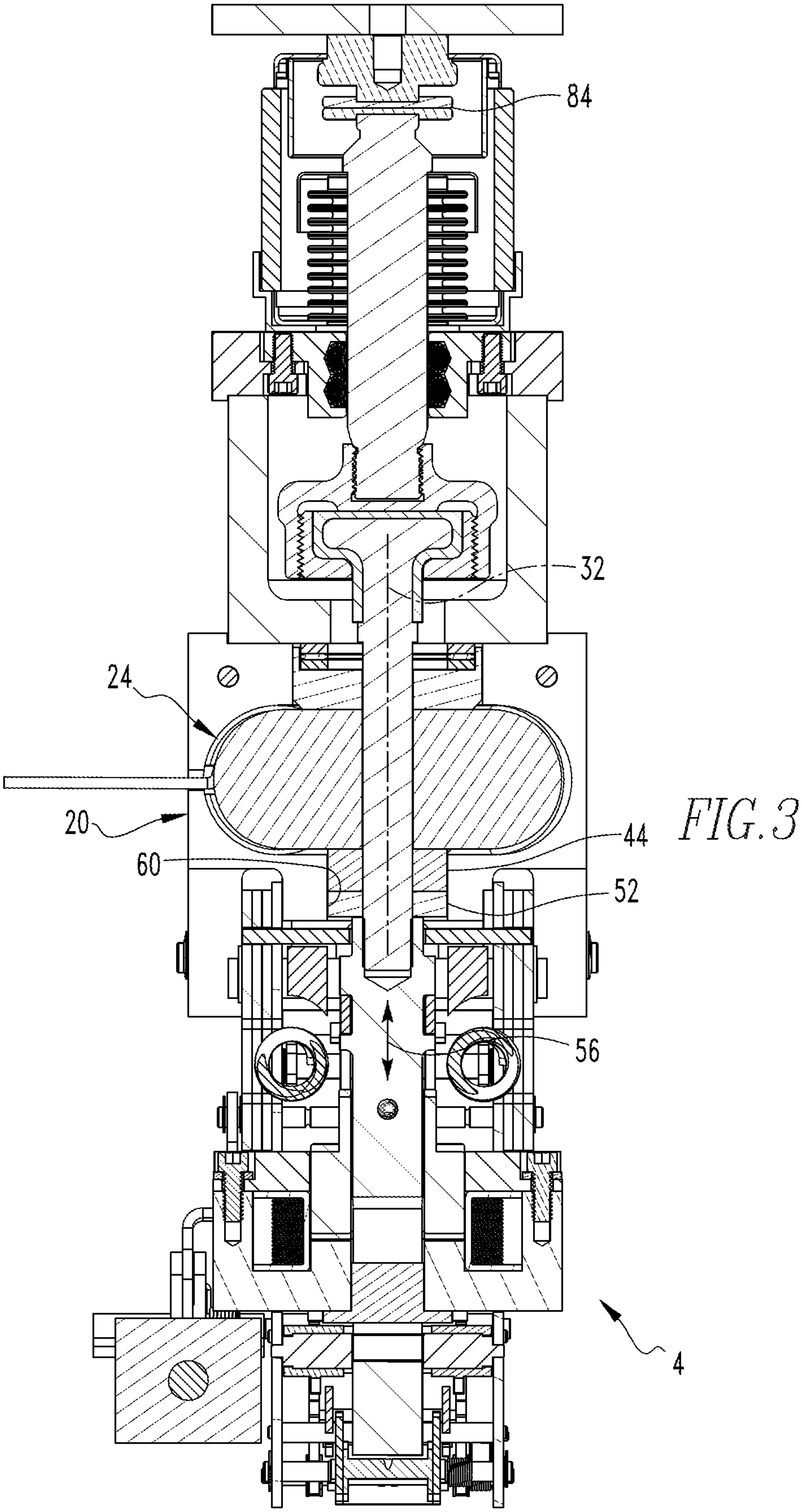
FIG. 3 is a sectional view as taken along line 3-3 of FIG. 2 and depicting the actuator when a plurality of Thomson coils of the actuator are in a non-energized state.
Figure 4:
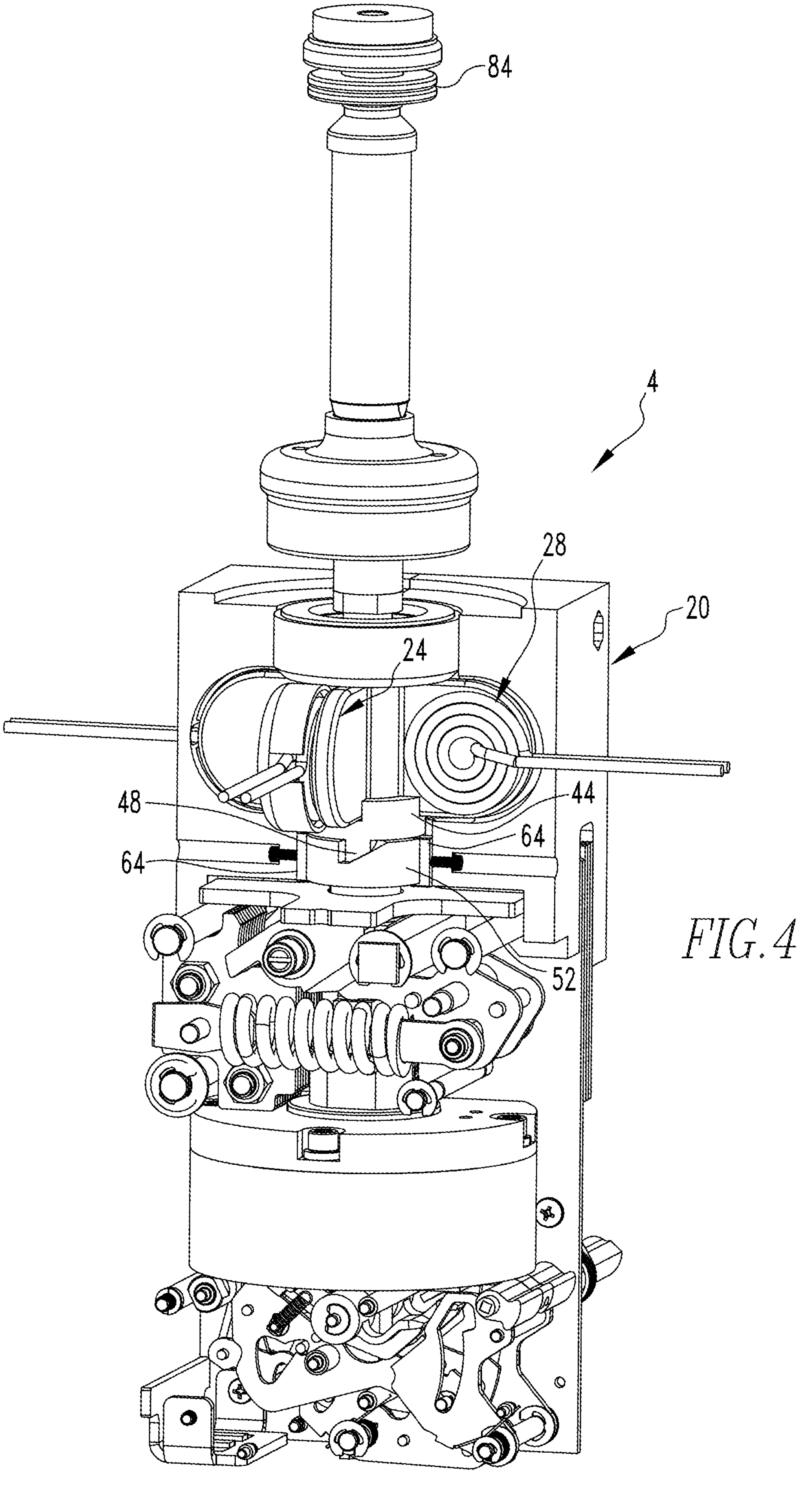
FIG. 4 is a view similar to FIG. 3, except depicting portions of the actuator in a perspective fashion.
Figure 5:
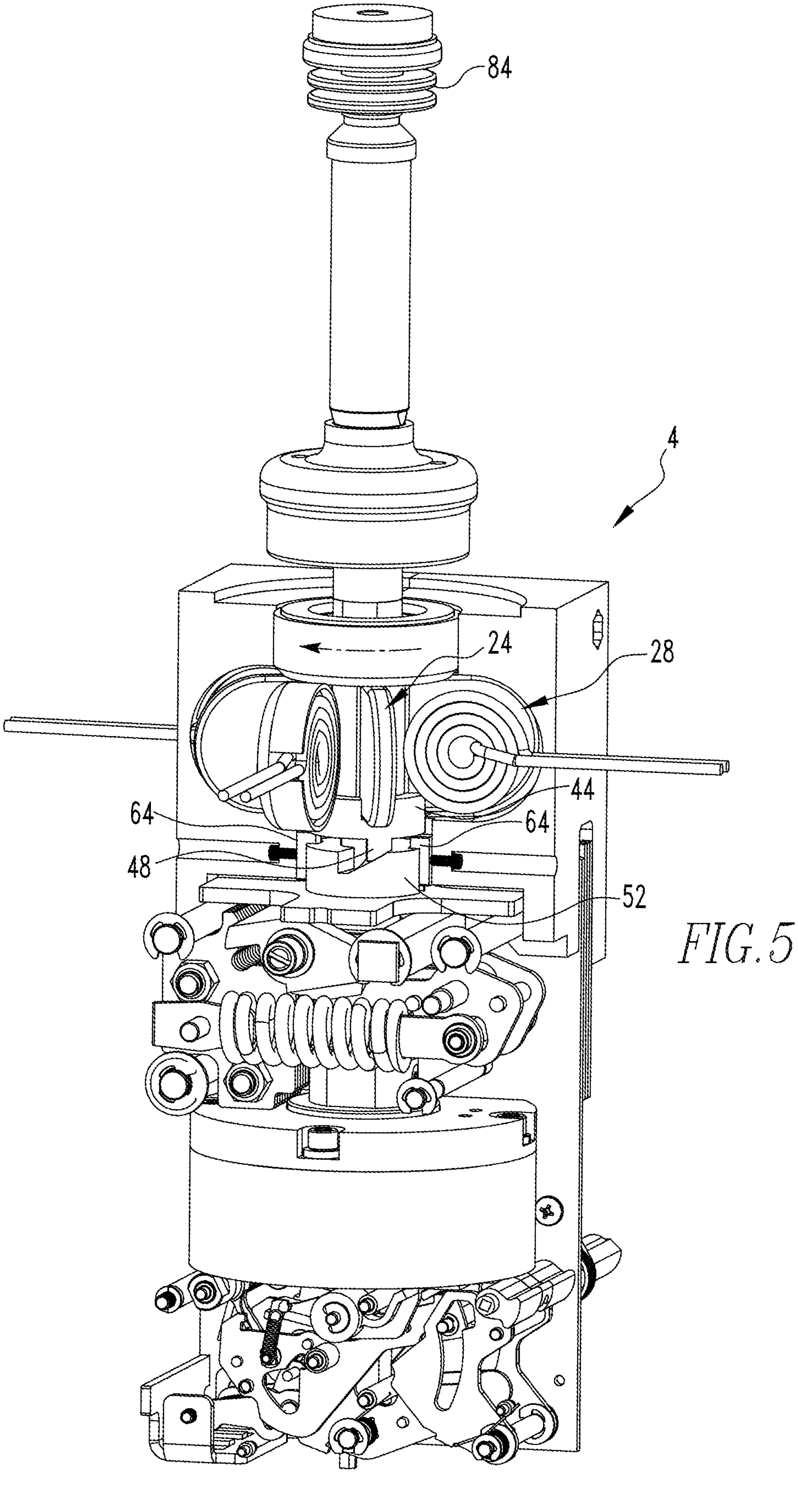
FIG. 5 is a view similar to FIG. 4, except depicting the portions of the actuator after the Thomson coils have been energized.
Figure 6:
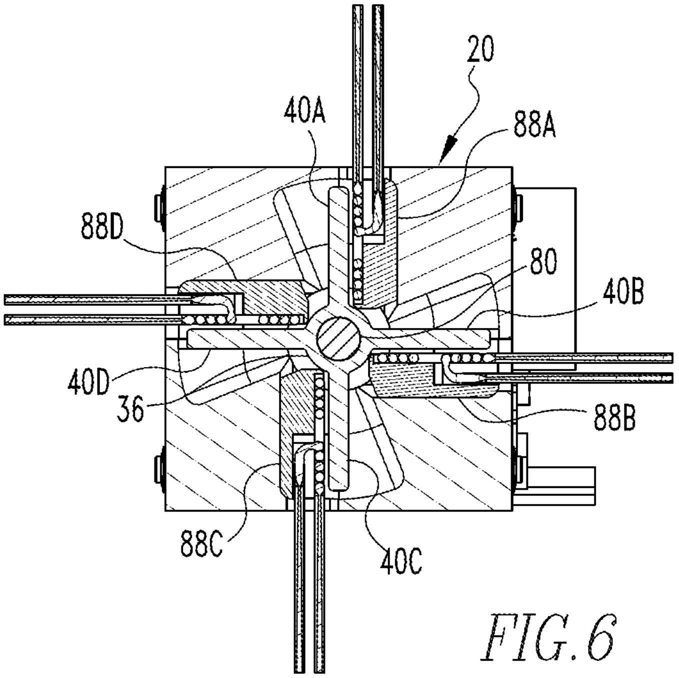
FIG. 6 is a sectional view as taken along line 6-6 of FIG. 2 and depicting a portion of the actuator including a portion of a support when the plurality of Thomson coils are in a non-energized state.
Figure 7:
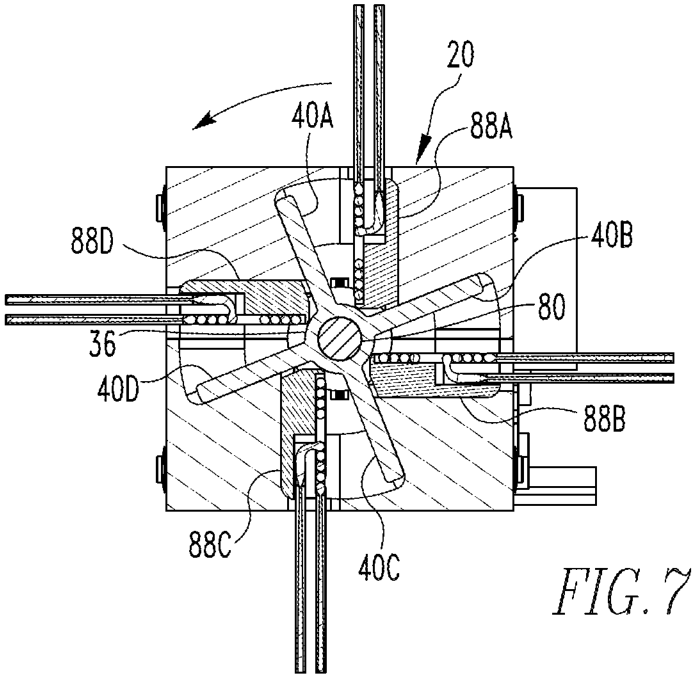
FIG. 7 is a view similar to FIG. 6, except depicting the portion of the actuator and the portion of the support after the Thomson coils have been energized.
Figure 8:
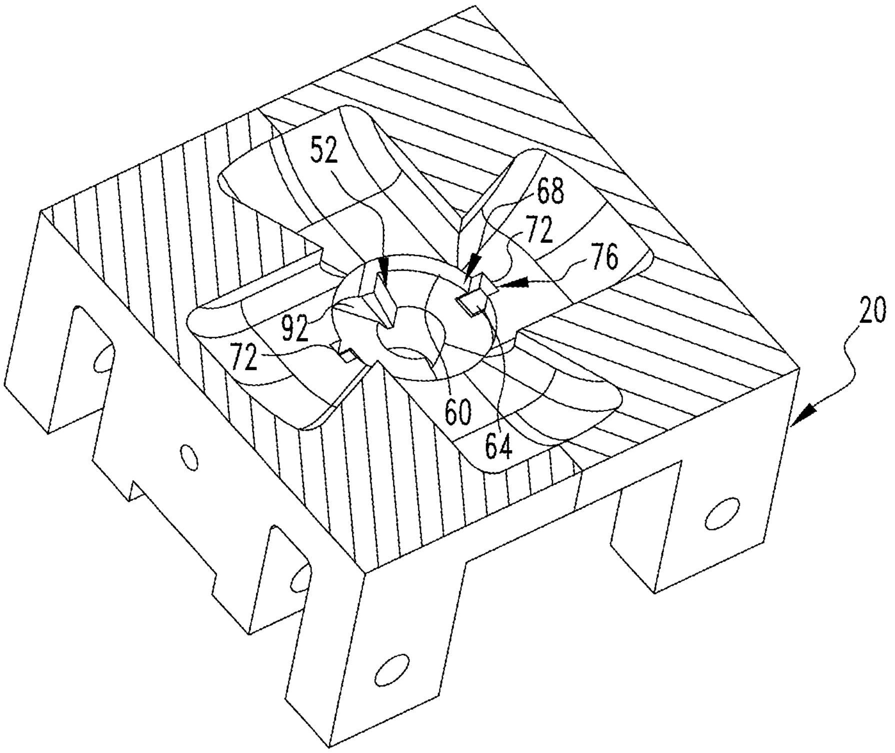
FIG. 8 is a view from a different perspective of the portion of the support that is depicted in FIGS. 6 and 7.

The actuator 4 is further depicted in FIG. 2 and is depicted in part in FIGS. 3-8. The actuator 4 can be said to include a support 20 upon which are situated an armature 24 and a Thomson coil apparatus 28. The armature 24 is rotatable about an axis of rotation 32 in response to the Thomson coil apparatus 28 being energized by, for example, a capacitor bank.

The armature 24 is formed of a conductive material such as copper or aluminum and includes a tubular hub 36 and a plurality of Thomson plates that are generally indicated at the numeral 40. The Thomson plates 40 are, in the depicted exemplary embodiment, four in quantity and thus can be referred to with the numerals 40A, 40B, 40C, and 40D. The Thomson plates 40 each extend radially outwardly from the hub 36 in a direction generally away from the axis of rotation 32 and are equally circumferentially spaced ninety degrees apart from one another.

The armature 24 further includes an output shaft 44 that includes a cam 48 that rotates with the output shaft 44. The armature 24 additionally includes a follower 52 that is cooperable with the cam 48. When the Thomson coil apparatus 28 is energized in a fashion that is set forth in greater detail elsewhere herein, the armature 24 is caused to responsively rotate a rotational distance, such as is depicted generally in the positional difference between FIGS. 6 and 7. Such rotation of the armature 24 the rotational distance about the axis of rotation 32 causes the follower 52 to responsively translate a linear distance along a translation axis 56 that is coaxial with the axis of rotation 32.

The follower 52 is movably situated in an opening 60 that is formed in the support 20, but the follower 52 is advantageously constrained to move only via translation, i.e., linear motion, and along the translation axis 56. That is, the follower 52 is advantageously resisted from rotating with respect to the support 20, and this is accomplished by providing a pair of tabs 64 on the follower 52 that function as a first guide portion 68 and by providing a pair of corresponding slots 72 that are formed on the support 20 within the opening 60 and that function as a second guide portion 76. The first and second guide portions 68 and 76 cooperate to restrain the motion of the follower 52 with respect to the support 20 to be merely translational motion of the follower 52, i.e., motion along a straight line, along the translation axis 56. In this regard, the tabs 64 are slidably received in the slots 72.

The actuator 4 further includes a shank 80 upon which the armature 24 is rotatably situated and that is mechanically connected with a set of separable contacts 84 of the first circuit interrupter 12. When the Thomson coil apparatus 28 is in a non-energized state, such as is depicted generally in FIGS. 3 and 4, the set of separable contacts 84 are in a closed state, meaning that the set of separable contacts 84 are electrically connected with one another. However, when the Thomson coil apparatus 28 is energized and the armature 24 is caused to thereby rotate the cam 48 the rotational distance about the axis of rotation 32 and to thereby cause the follower 52 to responsively move the linear distance along the translation axis 56, the follower 52 pulls the shank 80 along the translation axis 56 to cause the set of separable contacts 84 to be in an open state, such as is generally in FIG. 5. In so doing, the current that had been flowing through the first circuit interrupter 12 is commutated to instead flow through the second circuit interrupter 16, which is operable to interrupt current flowing therethrough in an understood fashion.

The Thomson coil apparatus 28 can be said to include a plurality of Thomson coils that are indicated generally at the 88. The Thomson coils 88 are four in quantity and can also be referred to with the numerals 88A, 88B, 88C, and 88D. In the depicted exemplary embodiment, the four Thomson coils 88 are positioned to be axisymmetric with respect to the axis of rotation 32 and, in the depicted exemplary embodiment, are circumferentially positioned ninety degrees apart from one another. It is noted, for instance, that the Thomson coils 88A and 88C are diametrically opposed to one another, and that the Thomson coils 88B and 88D are likewise diametrically opposed to one another, with respect to the hub 36. In this regard, it is noted that the Thomson coils 88A and 88C could be diametrically opposed to one another, and that the Thomson coils 88B and 88D could be likewise diametrically opposed to one another, and the Thomson coils 88 could still be axisymmetric with respect to the axis of rotation 32 even if the Thomson coils 88 are not necessarily positioned ninety degrees apart from one another. For instance, the Thomson coil 88A might be 100 degrees apart from the Thomson coil 88B but might be only 80 degrees apart from the Thomson coil 88D. It is also noted that the Thomson coils 88 need not necessarily be axisymmetric with respect to the axis of rotation 32 and can still be within the spirit of the instant disclosure. For instance, a plurality of the Thomson coils 88 might be situated along only one-half the circumference of the armature 24 and could still be within the spirit of the instant disclosure.

The Thomson coils 88 are advantageously electrically connected with one another in parallel, which advantageously reduces the effective inductance of the Thomson coil apparatus 28 combined with the set of Thomson plates 40. This advantageously achieves a quick rise time, which is the time required to reach peak force between the Thomson coil apparatus 28 and the armature 24. When the Thomson coils 88 are in a non-energized state, each of the Thomson coils 88A, 88B, 88C, and 88D, is situated adjacent a corresponding Thomson plate 40A, 40B, 40C, and 40D. When the Thomson coils 88 are energized, the magnetic fields that are formed in the Thomson coils 88 induce in the corresponding Thomson plates 40 currents that form equal and opposite magnetic fields that result in magnetic repulsion between the Thomson coils 88 and the Thomson plates 40. Since the Thomson coils 88 are affixed to the support 20, and inasmuch as the armature 24 is rotatably situated on the support 20, energizing the Thomson coils 88 results in the armature 24 rapidly rotating about the axis of rotation 32. It is also noted that the follower 52 has a reaction surface 92 that is oriented at a particular angle with respect to the translation axis 56. When the angle is 45 degrees, rotation of the cam 48 and corresponding translation of the follower 52 can be said to be 1:1. However, if the angle is adjusted to instead be, for instance, a much steeper 14 degrees, the cam 48 and the follower 52 can together amplify the translation of the follower 52 with respect to the rotation of the cam 48 in, for instance, a 1:4 ratio. This would assist with rapid translation of the follower 52 along the translation axis 56 in response to a relatively modest rotation of the cam 48 about the axis of rotation 32. The angle of the reaction surface 92 and of the corresponding driving surface of the cam 48 can be tuned to achieve a desired translational distance along the translation axis 56 in response to a given rotation of the armature 24 about the axis of rotation 32.

It is also noted that the actuator 24 can be configured to perform other functions that are merely rotational in nature and thus can be configured to not include the cam 48 and the follower 52. For instance, the actuator 4 can be a part of a rotational actuator wherein the Thomson coil apparatus 28, when energized, causes rotation of the armature 24 to rotate a rotatable component of the rotational actuator. Other variations and benefits will be apparent.

While specific embodiments of the disclosed concept have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the disclosed concept which is to be given the full breadth of the claims appended and any and all equivalents thereof

What is claimed is:

1. An actuator comprising:

a support;

an armature that is rotatable with respect to the support about an axis of rotation;

a plurality of Thomson coils that are each spaced from the axis of rotation;

the armature comprising a hub and a plurality of Thomson plates, the plurality of Thomson plates each being electrically conductive and extending from the hub, each Thomson plate of the plurality of Thomson plates being situated adjacent a corresponding Thomson coil of the plurality of Thomson coils when the plurality of Thomson coils are in a non-energized state; and the armature further comprising an output shaft connected with the hub and being structured to rotate a rotational distance responsive to the Thomson coils being energized.

2. The actuator of claim 1 wherein the plurality of Thomson coils are electrically connected together in parallel.

3. The actuator of claim 1 wherein the armature further comprises a cam situated on the output shaft and a follower situated on the support, the cam and the follower being cooperative with one another, the follower being structured to translate a linear distance along a translation axis responsive to the hub rotating the rotational distance.

4. The actuator of claim 3 wherein the follower comprises a first guide portion and the support comprises a second guide portion, the first and second guide portions being cooperable with one another to resist rotation of the follower with respect to the support while permitting the follower to translate along the translation axis.

5. The actuator of claim 4 wherein the first guide portion is one of a number of slots and a number of tabs, and wherein the second guide portion is the other of a number of slots and a number of tabs, the number of tabs being slidably received in the number of tabs.

6. The actuator of claim 1 wherein the plurality of Thomson coils are situated one of axisymmetric and non-axisymmetric about the axis of rotation.

7. The actuator of claim 6 wherein the plurality of Thomson coils are situated axisymmetric about the axis of rotation.

8. The actuator of claim 6 wherein a pair of Thomson coils of the plurality of Thomson coils are diametrically opposed to one another on opposite sides of the axis of rotation.

9. The actuator of claim 8 wherein another pair of Thomson coils of the plurality of Thomson coils are diametrically opposed to one another on opposite sides of the axis of rotation.

10. The actuator of claim 9 wherein the pair of Thomson coils and the another pair of Thomson coils are situated ninety degrees apart from one another about the axis of rotation.

11. A combination comprising:

a first circuit interrupter;

a second circuit interrupter;

an actuator structured to switch a current path that includes a protected portion of a circuit between the first interrupter and the second interrupter, the actuator comprising:

a support;

an armature that is rotatable with respect to the support about an axis of rotation;

a plurality of Thomson coils that are each spaced from the axis of rotation;

the armature comprising a hub and a plurality of Thomson plates, the plurality of Thomson plates each being electrically conductive and extending from the hub, each Thomson plate of the plurality of Thomson plates being situated adjacent a corresponding Thomson coil of the plurality of Thomson coils when the plurality of Thomson coils are in a non-energized state; and the armature further comprising an output shaft connected with the hub and being structured to rotate a rotational distance responsive to the Thomson coils being energized.

12. The combination of claim 11 wherein the plurality of Thomson coils are electrically connected together in parallel.

13. The combination of claim 11 wherein the armature further comprises a cam situated on the output shaft and a follower situated on the support, the cam and the follower being cooperative with one another, the follower being structured to translate a linear distance along a translation axis responsive to the hub rotating the rotational distance.

14. The combination of claim 13 wherein the follower comprises a first guide portion and the support comprises a second guide portion, the first and second guide portions being cooperable with one another to resist rotation of the follower with respect to the support while permitting the follower to translate along the translation axis.

15. The combination of claim 14 wherein the first guide portion is one of a number of slots and a number of tabs, and wherein the second guide portion is the other of a number of slots and a number of tabs, the number of tabs being slidably received in the number of tabs.

16. The combination of claim 11 wherein the plurality of Thomson coils are situated one of axisymmetric and non-axisymmetric about the axis of rotation.

17. The combination of claim 16 wherein the plurality of Thomson coils are situated axisymmetric about the axis of rotation.

18. The combination of claim 16 wherein a pair of Thomson coils of the plurality of Thomson coils are diametrically opposed to one another on opposite sides of the axis of rotation.

19. The combination of claim 18 wherein another pair of Thomson coils of the plurality of Thomson coils are diametrically opposed to one another on opposite sides of the axis of rotation.

20. The combination of claim 19 wherein the pair of Thomson coils and the another pair of Thomson coils are situated ninety degrees apart from one another about the axis of rotation.

* * * * *